United States Patent
Li

(10) Patent No.: US 12,367,796 B2
(45) Date of Patent: Jul. 22, 2025

(54) CONTROL CIRCUIT, DISPLAY DEVICE, AND ELECTRONIC EQUIPMENT

(71) Applicant: TCL China Star Optoelectronics Technology Co., Ltd., Shenzhen (CN)

(72) Inventor: Wenfang Li, Shenzhen (CN)

(73) Assignee: TCL CHINA STAR OPTOELECTRONICS TECHNOLOGY CO., LTD, Shenzhen (CN)

(*) Notice: Subject to any disclaimer, the term of this patent is extended or adjusted under 35 U.S.C. 154(b) by 75 days.

(21) Appl. No.: 17/295,452

(22) PCT Filed: Apr. 26, 2021

(86) PCT No.: PCT/CN2021/090011
§ 371 (c)(1),
(2) Date: May 15, 2024

(87) PCT Pub. No.: WO2022/193409
PCT Pub. Date: Sep. 22, 2022

(65) Prior Publication Data
US 2024/0296761 A1 Sep. 5, 2024

(30) Foreign Application Priority Data
Mar. 19, 2021 (CN) .................. 202110294277.X

(51) Int. Cl.
*G09G 3/00* (2006.01)
*G01K 3/00* (2006.01)
*G01K 7/21* (2006.01)
*G01K 7/22* (2006.01)
*G09G 3/36* (2006.01)

(52) U.S. Cl.
CPC ............ *G09G 3/006* (2013.01); *G01K 3/005* (2013.01); *G01K 7/21* (2013.01); *G01K 7/22* (2013.01); *G09G 3/36* (2013.01); *G09G 3/3696* (2013.01); *G09G 2320/00* (2013.01); *G09G 2320/041* (2013.01)

(58) Field of Classification Search
CPC ............ G09G 2320/041; G09G 3/006; G09G 2320/00; G09G 3/36; G09G 3/3696; G01K 7/22; G01K 7/25; G01K 3/005; G01K 7/24
See application file for complete search history.

(56) References Cited

U.S. PATENT DOCUMENTS 10,501,003 B2* 12/2019 Kimura .............. F21S 41/141
2011/0160931 A1* 6/2011 Hsieh .................. G05D 23/24
700/300

(Continued)

*Primary Examiner* — Dismery Mercedes
(74) *Attorney, Agent, or Firm* — Nathan & Associates Patent Agents Ltd.; Menachem Nathan

(57) ABSTRACT

The embodiments of the present disclosure provide a control circuit, a display device, and electronic equipment. The control circuit includes a temperature detection unit, a control unit, a voltage output unit, and a thin-film transistor. The display device includes anyone control circuit described above. The electronic equipment includes anyone control circuit described above. The embodiments of the present disclosure perform temperature compensation on the output voltage, so that the liquid crystal display panel can achieve better display effects at different temperature conditions.

12 Claims, 4 Drawing Sheets

(56) References Cited

U.S. PATENT DOCUMENTS

| | | | | |
|---|---|---|---|---|
| 2015/0084705 | A1* | 3/2015 | Arai | H03L 1/028 |
| | | | | 327/512 |
| 2015/0223304 | A1* | 8/2015 | Li | H05B 45/50 |
| | | | | 315/118 |
| 2015/0355488 | A1* | 12/2015 | Wang | G02F 1/13306 |
| | | | | 349/37 |
| 2017/0098424 | A1* | 4/2017 | Nam | G06F 1/3206 |
| 2017/0302264 | A1* | 10/2017 | Cao | G09G 3/36 |
| 2018/0020507 | A1* | 1/2018 | Liu | H05B 6/06 |
| 2019/0057668 | A1* | 2/2019 | Xiong | G09G 3/3696 |
| 2022/0214228 | A1* | 7/2022 | Shibata | G01K 7/25 |
| 2022/0321106 | A1* | 10/2022 | Iwawaki | H03K 17/063 |
| 2023/0062239 | A1* | 3/2023 | Zhou | H05B 45/18 |

* cited by examiner

CONTROL CIRCUIT, DISPLAY DEVICE, AND ELECTRONIC EQUIPMENT

FIELD

The present disclosure relates to the technical field of display equipment, and specifically to a control circuit, a display device, and electronic equipment.

BACKGROUND

In a liquid-crystal display (LCD), each of pixels is electrically connected to one of thin-film transistors. Generally, it is necessary to input turn-on and turn-off voltages to a liquid-crystal panel to control turn-on and turn-off of the thin-film transistors in the pixels of the liquid-crystal panel. Generally, the turn-on voltage is a constant-high voltage. However, in the low-temperature environment, the turn-on voltage at room temperature cannot normally turn on the thin-film transistors. As a result, the thin-film transistors cannot normally be charged and discharged, which will cause a liquid crystal display device to be abnormal for display.

SUMMARY

Technical Problem

A problem of poor display effect caused by unsatisfactory charging of thin-film transistors under low-temperature conditions in the prior art is to be solved.

Solution to Problem

Technical Solution

Embodiments of the present disclosure provide a control circuit, a display device and electronic equipment, that are used to solve a problem of poor display effect caused by unsatisfactory charging of thin-film transistors under low-temperature conditions in the prior art.

A control circuit, that includes:
a temperature detection unit;
a control unit electrically connected the temperature detection unit, wherein the control unit is configured to output a control command according to temperature detected by the temperature detection unit;
a voltage output unit electrically connected to the control unit; and
a thin-film transistor electrically connected to the voltage output unit;
wherein the voltage output unit is configured to output a corresponding voltage, that is configured to turn on the thin-film transistor, to the thin-film transistor, according to the control command.

Further, the temperature detection unit includes a thermistor, wherein a first terminal of the thermistor is electrically connected to a power source and a second terminal of the thermistor is grounded;
the control unit includes a control command output port that is electrically connected to the first terminal of the thermistor and the voltage output unit;
the first terminal of the thermistor is configured to have a first voltage value in a first temperature range, so that the control command output port outputs a first command; and the first terminal of the thermistor is configured to have a second voltage value in a second temperature range, so that the control command output port outputs a second command.

Further, the first terminal of the thermistor configured to have the first voltage value at 0° C., so that the control command output port outputs the first command; and
the first terminal of the thermistor configured to have the second voltage value at −10° C., so that the control command output port outputs the second command.

Further, the thermistor is able to be a negative-temperature-coefficient thermistor or a positive-temperature-coefficient thermistor.

Further, the temperature detection unit includes:
a first voltage-dividing unit, wherein a first terminal of the first voltage-dividing unit is electrically connected to the power source, and a second terminal of the first voltage-dividing unit is electrically connected to the first terminal of the thermistor.

Further, the control unit further includes a control switch, wherein a first terminal of the control switch is electrically connected to the first terminal of the thermistor, a second terminal of the control switch is grounded, and a third terminal of the control switch is electrically connected to the control command output port;
when the first terminal of the control switch has the first voltage value, the control switch is in a turn-off state, the control command output port has a third voltage value, so that the control command output port outputs the first command;
when the first terminal of the control switch has the second voltage value, the control switch is in a turn-on state, the control command output port has a fourth voltage value, so that the control command output port outputs the second command.

Further, the control unit further includes a metal-oxide-semiconductor (MOS) transistor, wherein a gate of the MOS transistor is electrically connected to the first terminal of the thermistor, a source of the MOS transistor is grounded, and a drain of the MOS transistor is electrically connected to the control command output port;
when the gate of the MOS transistor has the first voltage value, the MOS transistor is in the turn-off state, the control command output port has the third voltage value, so that the control command output port outputs the first command;
when the gate of the MOS transistor has the second voltage value, the MOS transistor is in the turn-on state, the control command output port has the fourth voltage value, so that the control command output port outputs the second command.

Further, the temperature detection unit further includes:
a second voltage-dividing unit, wherein a first terminal of the second voltage-dividing unit is electrically connected to the power source, and a second terminal of the second voltage-dividing unit is electrically connected to the control command output port.

Further, when the first command is outputted, the voltage outputted by the voltage output unit is a first preset voltage;
when the second command is outputted, the voltage outputted by the voltage output unit is a second preset voltage;
the first preset voltage and the second preset voltage are configured to turn on the thin-film transistor.

Further, the first command is a first-level value and the second command is a second-level value;

when a difference between the first-level value and the second-level value is within a first preset range, the voltage outputted by the voltage output unit is a first preset voltage;

when a difference between the first-level value and the second-level value is within a second preset range, the voltage outputted by the voltage output unit is a second preset voltage;

the first preset voltage and the second preset voltage are configured to turn on the thin-film transistor.

Further, the first preset voltage is 28 volt (V); and the second preset voltage is 35 volt.

Further, the voltage output unit includes:

a communication bus;

a logic board electrically connected to the control unit; and a power management integrated circuit electrically connected to the logic board via the communication bus;

wherein the logic board controls a voltage outputted by the power management integrated circuit via the communication bus.

An embodiment of the present disclosure further provides a display device, which is characterized by including any control circuit described above.

An embodiment of the present disclosure further provides electronic equipment, which is characterized by including any control circuit described above.

Advantageous Effect of Present Disclosure

Advantageous Effect

The control circuit of the embodiment of the present disclosure includes the temperature detection unit, the control unit, the voltage output unit, and the thin-film transistor. The temperature detection unit is used to detect the ambient temperature, the control unit is used to output the control command according to the temperature detected by the temperature detection unit, the voltage output unit is used to output the corresponding voltage to the thin-film transistor according to the control command, so that the thin-film transistor is turned on. A display device provided by an embodiment of the present disclosure includes the above-mentioned control circuit, which can control to output an appropriate voltage value to ensure that the display device can normally display at low-temperature conditions. Electronic equipment provided by an embodiment of the present disclosure includes the above-mentioned control circuit, which can control to output an appropriate voltage value to ensure that the electronic equipment can normally operate at low-temperature conditions. The beneficial effect of the embodiments of the present disclosure is to perform temperature compensation on the output voltage via the control circuit, so that a liquid crystal display panel can achieve better display effects at different temperature conditions.

BRIEF DESCRIPTION OF DRAWINGS

Description of Drawings

In order to more clearly illustrate the technical solutions in the embodiments of the present disclosure, the following will briefly introduce the drawings that need to be used in the description of the embodiments. Obviously, the drawings in the following description are only some embodiments of the present disclosure. For those skilled in the art, other drawings can be obtained based on these drawings without creative work.

Figure 1:
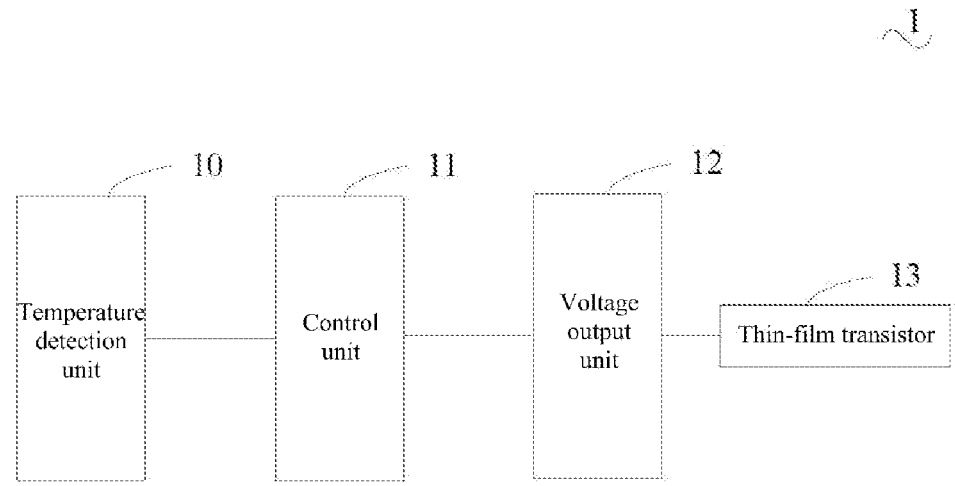

FIG. 1 is a schematic diagram of a control circuit provided by an embodiment of the present disclosure.

Figure 2:
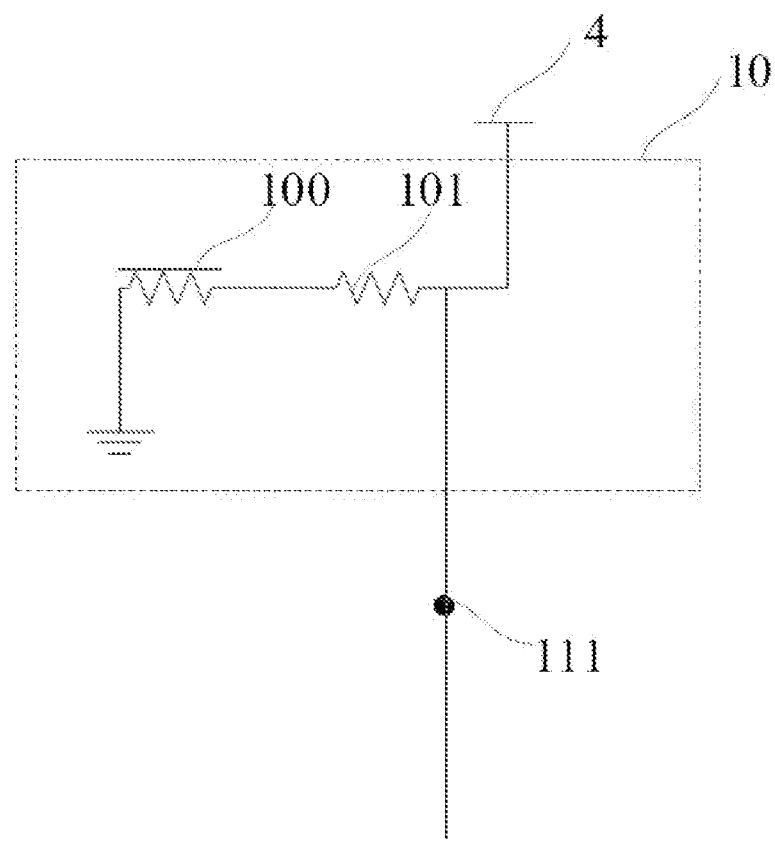

FIG. 2 is a partial circuit diagram of a control circuit provided by an embodiment of the present disclosure.

Figure 3:
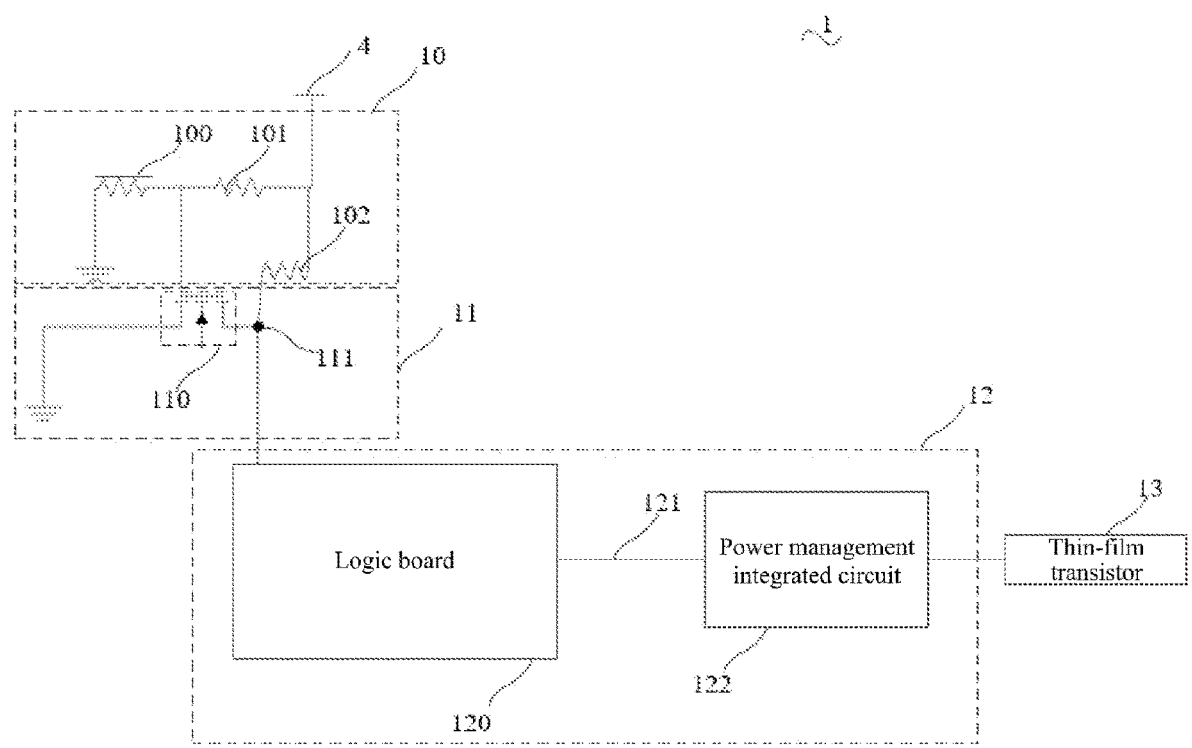

FIG. 3 is a circuit diagram of a control circuit provided by an embodiment of the present disclosure.

Figure 4:
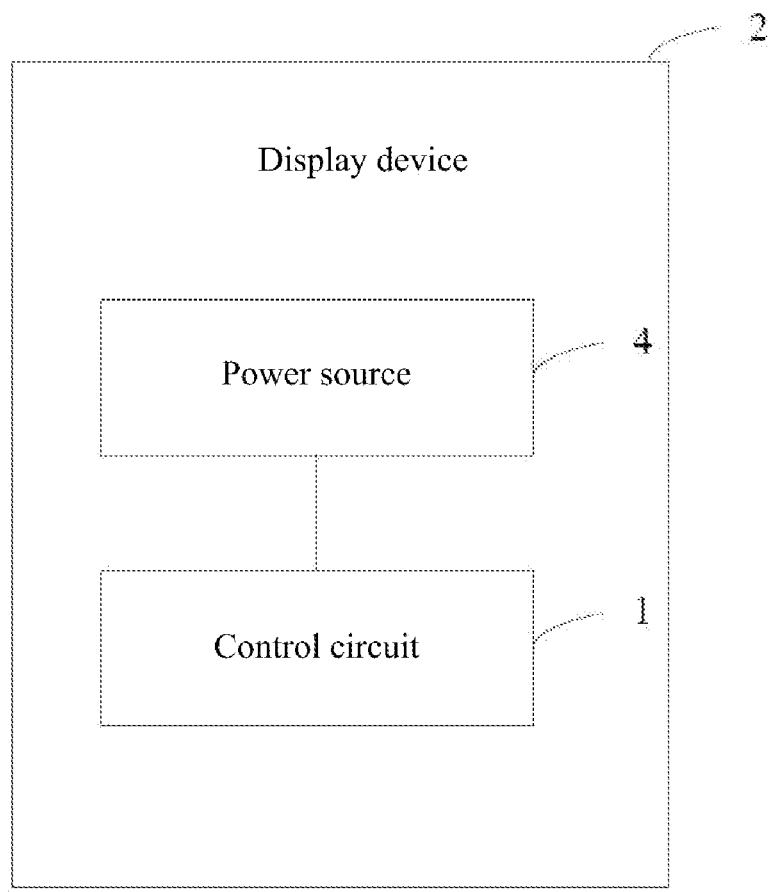

FIG. 4 is a schematic diagram of a display device provided by an embodiment of the present disclosure.

Figure 5:
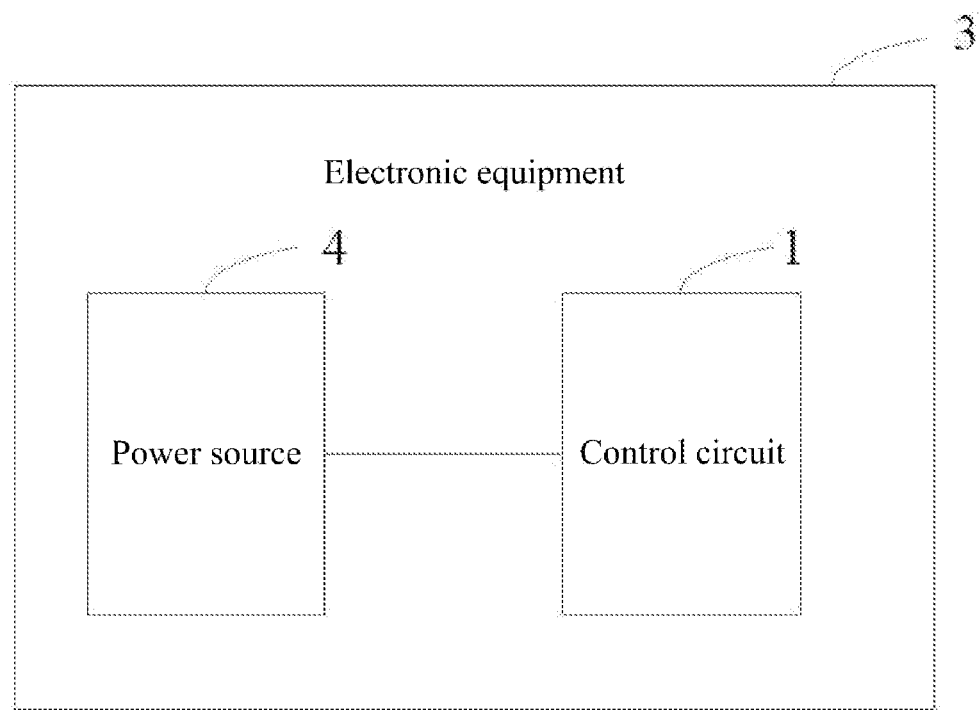

FIG. 5 is a schematic diagram of electronic equipment provided by an embodiment of the present disclosure.

EMBODIMENTS OF INVENTION

Detailed Description of Preferred Embodiments

The technical solutions in the embodiments of the present disclosure will be clearly and completely described below in conjunction with the drawings in the embodiments of the present disclosure. Obviously, the described embodiments are only a part of the embodiments of the present disclosure, rather than all the embodiments. Based on the embodiments in the present disclosure, all other embodiments obtained by those skilled in the art without creative work shall fall within the protection scope of the present disclosure.

In the description of the present disclosure, it should be understood that terms such as "first" and "second" are only used to distinguish similar objects, and cannot be understood as indicating or implying relative importance or implicitly indicating the number of indicated technical features.

The embodiments of the present disclosure provide a control circuit, a display device, and electronic equipment. The control circuit can be widely used in liquid crystal displays (LCDs) and electronic devices with liquid crystal display panels, such as mobile phones, personal digital assistants (PDAs), digital cameras, computer screens, or notebook computer screens.

Please refer to FIG. 1, which is a schematic diagram of a control circuit provided by an embodiment of the present disclosure. As shown in FIG. 1, the control circuit 1 provided by the embodiment of the present disclosure includes a temperature detection unit 10, a control unit 11, a voltage output unit 12, and a thin-film transistor 13. The temperature detection unit 10, the control unit 11, the voltage output unit 12, and the thin-film transistor 13 are electrically connected in sequence. The temperature detection unit 10 is used to detect changes in the ambient temperature, the control unit 11 is used to convert the temperature changes detected by the temperature detection unit 10 into corresponding electrical changes to output corresponding control command, and the voltage output unit 12 is used to output corresponding voltages to the thin-film transistor 13 according to the control command, so that the thin-film transistor 13 is turned on.

It is understandable that a thin-film transistor type display is the mainstream display device on various notebook computers and desktop computers. Each of liquid crystal pixels on this kind of display is driven by a thin-film transistor integrated behind the pixel. The thin-film transistor type display has the advantages of high responsiveness, high brightness, and high contrast. The thin-film transistor integrated behind the pixel has a turn-on voltage, and a value of a turn-on voltage will drift as temperature changes. In a normal temperature state, a startup voltage outputted by a circuit can reach the turn-on voltage of the thin-film transistor, but when the temperature changes, the startup voltage outputted by the circuit may not meet the turn-on voltage of the thin-film transistor. Therefore, it is necessary to perform temperature compensation on the circuit to control its output voltage to meet the turn-on voltage of the thin-film transistor under different temperature conditions.

Regarding the control circuit, the display device, and the electronic equipment of the embodiments of the present disclosure, the control circuit can input different voltages according to different ambient-temperature values, so as to ensure that the electronic equipment can normally operate at low-temperature conditions even in a low-temperature environment, thereby enabling that the liquid crystal display panel can achieve better display effects at different temperature conditions.

Please refer to FIG. 2, which is a partial circuit diagram of the control circuit provided by the embodiment of the present disclosure. The temperature detection unit 10 includes a thermistor 100 and a first voltage-dividing unit 101. A first terminal of the thermistor 100 is electrically connected to a power source 4. A second terminal of the thermistor 100 is grounded. A first terminal of the first voltage-dividing unit 101 is electrically connected to the power source 4. A second terminal of the first voltage-dividing unit 101 is electrically connected to the first terminal of the thermistor 100.

In some embodiments, the thermistor 100 may be a negative temperature coefficient (NTC) thermistor. NTC refers to the thermistor phenomenon, and material, whose resistance decreases exponentially with rising of temperature, has a negative temperature coefficient. The material is a semiconductor ceramic, which is made of two or more metal oxides, such as manganese, copper, silicon, cobalt, iron, nickel, and zinc, which are fully mixed, molded, and sintered and can be made into a negative temperature coefficient (NTC) thermistor. It's resistivity and material constants vary with the material composition ratio, sintering atmosphere, sintering temperature, and structural states. Now, there are non-oxide NTC thermistor materials represented by silicon carbide, tin selenide, or tantalum nitride, etc.

In some embodiments, the thermistor 100 may also be a positive-temperature-coefficient (PTC) thermistor. PTC generally refers to semiconductor materials or components with a large positive temperature coefficient. Usually, the mentioned PTC refers to the positive-temperature-coefficient thermistor, referred to as a PTC thermistor. The PTC thermistor is a typical temperature-sensitive semiconductor resistor, its resistance value increases stepwise as the rising of temperature when the temperature exceeds a certain temperature (Curie temperature). Ceramic PTC is a semiconductor ceramic made by sintering and using barium titanate (or strontium, lead) as the main component, adding a small amount of donor (e.g., Y, Nb, Bi, Sb), acceptor (e.g., Mn, Fe) elements, and additives such as glass (e.g., silicon oxide, alumina).

In the actual application process, considering the production cost, the thermistor with the negative temperature coefficient is generally used.

Understandably, the first terminal of the thermistor 100 is used to have a first voltage value in a first temperature range, so that the control command output port 111 outputs a first command. In addition, the second terminal of the thermistor 100 is used to have a second voltage value in a second temperature range, so that the control command output port 111 outputs a second command.

Preferably, when the ambient temperature is at 0° C., a resistance value of the thermistor 100 is low, the first terminal of the thermistor 100 has a low divided voltage with a low voltage value, and the control command output port 111 outputs the first command. In addition, when the ambient temperature is at −10° C., the resistance value of the thermistor 100 increases, and the divided voltage at the first terminal of the thermistor 100 increases to have a high voltage value, and the control command output port 111 outputs the first command.

In the embodiment of the present disclosure, the temperature of the environment where the control circuit is located is detected by the thermistor. The control circuit can output different voltages according to different temperature conditions to control the turn-on of the thin-film transistor. The thermistor has a simple structure and can simplify the control circuit. Meanwhile, the thermistor is more sensitive to temperature detection. Thus, the control circuit of the embodiment of the present disclosure enables more sensitively to change the output voltage as temperature changes.

Please refer to FIG. 3, which is a circuit diagram of a control circuit 1 provided by an embodiment of the present disclosure. The control circuit 1 includes a temperature detection unit 10, a control unit 11, a voltage output unit 12, and a thin-film transistor 13. The temperature detection unit 10, the control unit 11, the voltage output unit 12, and the thin-film transistor 13 are electrically connected in sequence. The temperature detection unit 10 is used to detect the ambient temperature, the control unit 11 is used to output a control command according to the temperature detected by the temperature detection unit 10, and the voltage output unit 12 is used to output a corresponding voltage to the thin-film transistor 13 according to the control command, so that the thin-film transistor 13 is turned on.

In the current technology, display effects of the liquid crystal display (LCD) change with temperatures. A startup voltage of some panels with the best display effect increases with the increase of temperature. In addition, the startup voltage of some panels with the best display effect decreases with the increase of temperature. The control circuit in the embodiment of the present disclosure performs temperature compensation on the output voltage, so that the LCD panel can achieve better display effects at different temperature conditions.

The temperature detection unit 10 further includes a second voltage-dividing unit 102. A first terminal of the second voltage-dividing unit 102 is electrically connected to the power source 4. A second terminal of the second voltage-dividing unit 102 is electrically connected to the control command output port 111.

The control unit 11 includes a control switch 110 and a control command output port 111. The control switch 110 has three terminals. A first terminal of the control switch 110 is electrically connected to the first terminal of the thermistor 100. A second end of the control switch 110 is grounded. A third end of the control switch 110 is electrically connected to the control command output port 111.

In some embodiments, the control switch 110 is a metal-oxide-semiconductor (MOS) transistor, which is widely used in analog circuits and digital circuits. MOS transistors can be divided, according to the polarity of their "channels" (operating carriers), into two types, "N-type" and "P-type," which are referred to as NMOS transistors and PMOS transistors, respectively. The operating principle of the MOS transistor (taking an N-channel enhancement MOS transistor as an example) is to control the amount of "induced charges" to change the condition of a conductive channel formed by these "induced charges," and then to achieve a purpose of controlling drain current. The MOS transistor has three terminals, i.e., source, drain, and gate. In the voltage control circuit 1, the gate of the MOS transistor 110 is electrically connected to the first end of the thermistor 100, the source of the MOS transistor 110 is grounded, and the drain of the MOS transistor 110 is electrically connected to the control command output port 111.

In some embodiments, when the thermistor 100 is a thermistor with a negative temperature coefficient, its resistance increases as the temperature decreases. When the ambient temperature is normal, preferably at 0° C., the resistance value of the thermistor 100 is lower, the first terminal of the thermistor 100 has a lower divided voltage, and the first terminal of the control switch 110 has a first voltage value. The control switch 110 is in a turn-off state. At this time, the third terminal of the control switch 110 is not turned on but grounded. The voltage value of the control command output port 111 is a third voltage value, so that the control command output port 111 outputs the first command.

It can be understood that when the ambient temperature is reduced, preferably at −10° C., the resistance value of the thermistor 100 increases significantly, the first terminal of the thermistor 100 has a higher divided voltage, and the first terminal of the control switch 110 has a second voltage value. The voltage value of the control switch 110 is in a turn-on state. At this time, the third terminal of the control switch 110 is turned on and is electrically connected to the control command output port 111. The voltage value of the control command output port 111 is a fourth voltage value, so that the control command output port 111 outputs the second command.

In the control circuit of the embodiment of the present disclosure, the control circuit outputs command according to the voltage value outputted by the control command output port, and the control logic of the control circuit is simpler.

In some embodiments, the first command is a first-level value, and the second command is a second-level value. When the first command is the first-level value, the voltage output unit 12 outputs a first preset voltage, the first preset voltage is preferably 28 volt (V). In addition, when the second command is the second-level value, the voltage output unit 12 outputs a second preset voltage, the second preset voltage is preferably 35V. The first preset voltage and the second preset voltage are used to enable the thin film transistor 13 to be normally turned on under various temperature conditions, so that the display panel can achieve a better display effect.

In some embodiments, the control unit 11 realizes the control of the output voltage by detecting the change of the level value of the control command output port 111. When a difference between the first-level value and the second-level value outputted by the control command output port 111 is within the first preset range, the voltage output unit 12 outputs the first preset voltage, the first preset voltage is preferably 28V. In addition, when the difference between the first level value and the second level value outputted by the control command output port 111 is within the second preset range, the voltage output unit 12 outputs the second preset voltage, the second preset voltage is preferably 35V. It can be understood that the first preset voltage and the second preset voltage are used to turn on the thin film transistor 13.

Regarding the control circuit of the embodiment of the present disclosure, the control circuit controls the output voltage value according to a range of the difference of the level values outputted by the control command output port. The voltage output unit does not need to change the output voltage according to each voltage value outputted by the control command output port. It can reduce the frequency changed by the voltage output unit and improve the stability of the circuit. The accuracy of the output voltage of the voltage output unit can also be improved, so that the control circuit is more accurate.

The voltage output unit 12 includes a logic board 120, a communication bus 121, and a power management integrated circuit 122. The logic board 120 is electrically connected to the control unit 11.

In some embodiments, when the logic board 120 detects that the command outputted by the control command output port 111 is the first command, the power management integrated circuit 122 executes a default command to output the first preset voltage, which is preferably 28V. When the logic board 120 detects that the command outputted by the control command output port 111 is the second command, the logic board 120 rewrites the command of the power management integrated circuit 122 via the communication bus 121 to output the second preset voltage, which is preferably 35V.

In some embodiments, when the logic board 120 detects that the difference between the first-level value and the second-level value outputted by the control command output port 111 is within the first preset range, the power management integrated circuit 122 executes the default command to output the first preset voltage, which is preferably 28V. When the logic board 120 detects that the difference between the first-level value and the second-level value outputted by the control command output port 111 is within the second preset range, the logic board 120 rewrites the command of the power management integrated circuit 122 via the communication bus 121 to output the second preset voltage, which is preferably 35V.

It can be understood that the communication bus 121 here includes a serial clock line and a bidirectional data line. The communication bus 121 has three types of signals in a process of transmitting data, which are a starting signal, an ending signal, and a response signal. The starting signal: when SCL is at a high level, SDA jumps from a high level to a low level and starts to transmit data. The ending signal: when SCL is at the high level, SDA jumps from the low level to the high level and ends the data transmission. The response signal: after 8-bits data is received, a specific low-level pulse is sent to a chip sending the data to indicate that the data has been received. After a central processing unit (CPU) sends a signal to a controlled unit, it waits for the controlled unit to send a response signal. After the response signal is received by the CPU, which determines whether it continues to transmit the signal according to the actual situation. If the response signal is not received, it is determined that the controlled unit is faulty.

It is understandable that the thin-film transistor type display is the mainstream display device on various notebook computers and desktop computers. Each of liquid-crystal pixels on this type of display is driven by the thin-film transistor integrated behind the pixel. The voltage across two of the terminals of the thin film transistor must reach a turn-on voltage to start normally, wherein the turn-on voltage of the thin-film transistor will drift as temperature changes.

Please refer to FIG. 4, which is a schematic diagram of a display device provided by an embodiment of the present disclosure. It can be seen that any of the above-mentioned control circuits 1 is applied to the display device 2.

Please refer to FIG. 5, which is a schematic diagram of electronic equipment provided by an embodiment of the present disclosure. It can be seen that any of the above-mentioned control circuits 1 are applied to electronic equipment 3.

It can be understood that the power source 4 here is an external environmental source. The control circuit 1 can be used as a circuit board to be installed in the display device and the electronic equipment. The display device and the electronic equipment include a power interface to provide voltage for the control circuit 1.

The control circuit of embodiments of the present disclosure includes a temperature detection unit, a control unit, a voltage output unit, and a thin film transistor. The temperature detection unit detects the ambient temperature. The control unit outputs the control command according to the temperature detected by the temperature detection unit. The voltage output unit outputs a corresponding voltage to the thin film transistor according to the control command, so that the thin film transistor can be turned on at any ambient temperature to enable the liquid crystal display panel to achieve better display effects at different temperature conditions. The display device provided by an embodiment of the present disclosure includes the above-mentioned control circuit, which can control to output an appropriate voltage value to ensure that the display device can normally display at low-temperature conditions. The electronic equipment further provided by an embodiment of the present disclosure includes the above-mentioned control circuit, which can raise the turn-on voltage in the low-temperature environment and ensures that the electronic equipment can normally operate at low-temperature conditions.

The control circuit, the display device, and the electronic equipment provided by the embodiments of the present disclosure have been described in detail above. Specific examples are used herein to describe the principle and implementation of the present disclosure. The description of the above embodiments is only used to help understand the present disclosure. Meanwhile, those skilled in the art can change in the specific implementation and the scope of the present disclosure, according to the idea of the present disclosure. In summary, the content of the present disclosure should not be construed as a limitation of the present disclosure.

What is claimed is:

1. A control circuit, comprising:
   a temperature detection unit;
   a control unit electrically connected the temperature detection unit, wherein the control unit is configured to output a control command according to temperature detected by the temperature detection unit;
   a voltage output unit electrically connected to the control unit; and
   a thin-film transistor electrically connected to the voltage output unit;
   wherein the voltage output unit is configured to output a corresponding voltage, that is configured to turn on the thin-film transistor, to the thin-film transistor, according to the control command;
   wherein
   the temperature detection unit comprises a thermistor, wherein a first terminal of the thermistor is electrically connected to a power source and a second terminal of the thermistor is grounded;
   the control unit comprises a control command output port that is electrically connected to the first terminal of the thermistor and the voltage output unit;
   the first terminal of the thermistor is configured to have a first voltage value in a first temperature range, so that the control command output port outputs a first command; and
   the first terminal of the thermistor is configured to have a second voltage value in a second temperature range, so that the control command output port outputs a second command;
   wherein
   the first command is a first-level value and the second command is a second-level value;
   when a difference between the first-level value and the second-level value is within a first preset range, the voltage output unit outputs a first preset voltage;
   when the difference between the first-level value and the second-level value is within a second preset range, the voltage output unit outputs a second preset voltage;
   the first preset voltage and the second preset voltage are configured to turn on the thin-film transistor.

2. The control circuit as claimed in claim 1, wherein
   the first terminal of the thermistor configured to have the first voltage value at 0° C., so that the control command output port outputs the first command; and
   the first terminal of the thermistor configured to have the second voltage value at −10° C., so that the control command output port outputs the second command.

3. The control circuit as claimed in claim 1, wherein
   the thermistor is a negative-temperature-coefficient thermistor or a positive-temperature-coefficient thermistor.

4. The control circuit as claimed in claim 1, wherein the temperature detection unit comprises:
   a first voltage-dividing unit, wherein a first terminal of the first voltage-dividing unit is electrically connected to the power source, and a second terminal of the first voltage-dividing unit is electrically connected to the first terminal of the thermistor.

5. The control circuit as claimed in claim 4, wherein the temperature detection unit further comprises:
   a second voltage-dividing unit, wherein a first terminal of the second voltage-dividing unit is electrically connected to the power source, and a second terminal of the second voltage-dividing unit is electrically connected to the control command output port.

6. The control circuit as claimed in claim 1, wherein
   the control unit further comprises a control switch, wherein a first terminal of the control switch is electrically connected to the first terminal of the thermistor, a second terminal of the control switch is grounded, and a third terminal of the control switch is electrically connected to the control command output port;
   when the first terminal of the control switch has the first voltage value, the control switch is in a turn-off state, the control command output port has a third voltage value, so that the control command output port outputs the first command;
   when the first terminal of the control switch has the second voltage value, the control switch is in a turn-on state, the control command output port has a fourth voltage value, so that the control command output port outputs the second command.

7. The control circuit as claimed in claim 1, wherein
   the control unit further comprises a metal-oxide-semiconductor (MOS) transistor, wherein a gate of the MOS transistor is electrically connected to the first terminal of the thermistor, a source of the MOS transistor is grounded, and a drain of the MOS transistor is electrically connected to the control command output port;

when the gate of the MOS transistor has the first voltage value, the MOS transistor is in the turn-off state, the control command output port has the third voltage value, so that the control command output port outputs the first command;

when the gate of the MOS transistor has the second voltage value, the MOS transistor is in the turn-on state, the control command output port has the fourth voltage value, so that the control command output port outputs the second command.

8. The control circuit as claimed in claim 1, wherein when the first command is outputted, the voltage output unit outputs a first preset voltage;

when the second command is outputted, the voltage output unit outputs a second preset voltage;

the first preset voltage and the second preset voltage are configured to turn on the thin-film transistor.

9. The control circuit as claimed in claim 8, wherein the first preset voltage is 28 volt; and the second preset voltage is 35 volt.

10. The control circuit as claimed in claim 1, wherein the voltage output unit comprises:

a communication bus;

a logic board electrically connected to the control unit; and a power management integrated circuit electrically connected to the logic board via the communication bus;

wherein the logic board controls a voltage outputted by the power management integrated circuit via the communication bus.

11. A display device comprising the control circuit as claimed in claim 1.

12. Electronic equipment comprising the control circuit as claimed in claim 1.

* * * * *